INVENTORS
THOMAS M. HOLLOWAY
JOSEPH E. FLECKENSTEIN

BY

Morsell & Morsell
ATTORNEYS

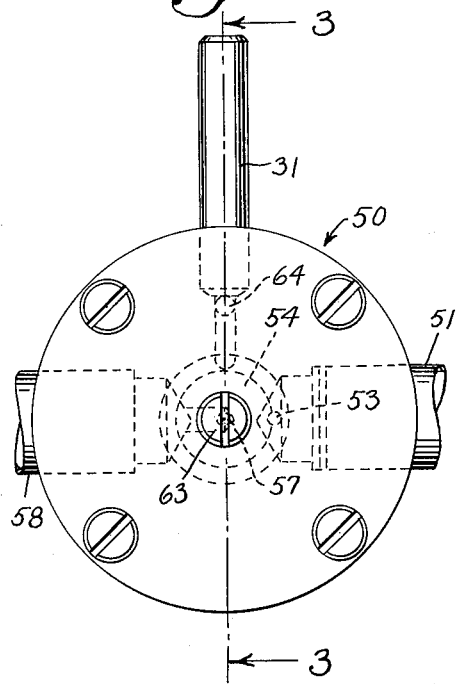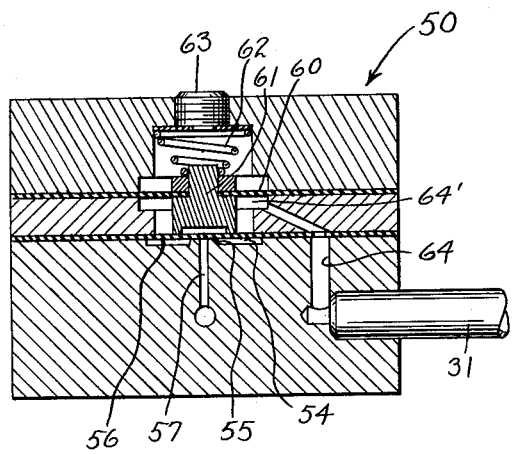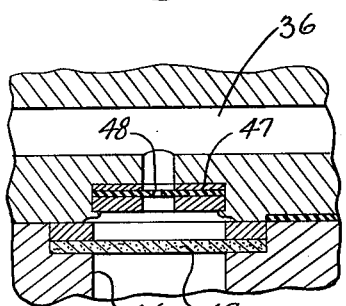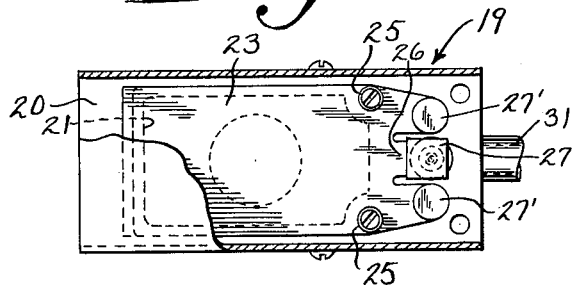
INVENTORS
THOMAS M. HOLLOWAY
JOSEPH E. FLECKENSTEIN
BY
ATTORNEYS United States Patent Office 3,226,024
Patented Dec. 28, 1965

1

3,226,024
CONTROLS FOR COMBINATION HEATING
AND COOLING SYSTEMS
Thomas M. Holloway, Waukesha, Wis., and Joseph E. Fleckenstein, Columbus, Ohio, assignors to Johnson Service Company, Milwaukee, Wis., a corporation of Wisconsin
Filed Sept. 26, 1963, Ser. No. 311,839
8 Claims. (Cl. 236—1)

This invention relates to improvements in controls for combination heating and cooling systems and more particularly to a valve opening and closing feature having a pneumatic amplifier which is responsive to low pressure.

In the use of combination heating and cooling systems wherein there is a heat exchanger through which the heating or cooling medium moves, it is desirable to close the heat exchanger valve in response to a rise in temperature when the heat exchanger is being used for winter conditions, and to close the valve in response to a fall in temperature when the system is being used for cooling in the summertime. This may be accomplished through the use of a number of pneumatic control systems such as with the reversible thermostatic system shown in Otto Patent No. 2,021,263.

In addition to the problems solved by the system of the Otto patent, when air is being circulated through a cooling coil to accomplish summer cooling, if the blower which produces the forced air circulation should inadvertently fail, condensation of moisture, normally prevented by the circulating air, will result in dripping water from the heat exchanger and possible damage. It is, therefore, highly desirable to also provide automatic means for closing the valve in the cooling medium line leading to the heat exchanger whenever air circulation fails. Where a single system is to be used for both heating and cooling, it is necessary that this valve closing feature be activated only on the cooling cycle, and that it so function as not to interfere with the thermostatic control when the air circulating blower is operating normally.

Another problem which arises is that in winter use, where hot water is being circulated through a heat exchanger normally having forced air circulation, it may be desirable to provide automatic means whereby the valve which controls the flow of hot water through the heat exchanger is maintained wide open whenever air circulation stops. Here, however, this function is useful only during the winter season and must be operable only when the device is on the heating cycle, and must also be worked out so as not to interfere with the normal thermostatic control when air circulation is functioning properly.

It is a general object of the present invention to provide an improved control system which is suitable for use in conjunction with a reversible summer-winter control system, such as that of the prior Otto Patent No. 2,021,263, and which also provides for automatic pneumatic control of the heat exchanger valve to prevent circulation of the cooling medium through the heat exchanger when the blower fails, the single installation also providing means for maintaining the supply valve to the heat exchanger in open condition during winter use whenever the forced air circulation fails, and the system being responsive to a supply pressure of one value in performing its winter function and to a supply pressure of a different value when performing its summer function.

A more specific object of the invention is to provide a control system as above described, wherein there is means including a novel pneumatic amplifier for sensing the "on" or "off" condition of relatively low pressure circulation, said amplifier being effective to produce a substantial output pressure change in the control circuit in response to a relatively low pressure signal.

A still further object of the invention is to provide a novel pneumatic amplifier responsive to low pressure air circulation and having a leakport arranged to produce a substantial output pressure change in a pneumatic control conduit.

A further object of the invention is to provide in a control system as above described, a novel combination including a pneumatic amplifier in conjunction with auxiliary pneumatic valves which will permit the passage of control air selectively in accordance with predetermined supply pressures, whereby the same control system may be used to close the supply valve to a heat exchanger in response to abnormal conditions and be actuated by a supply pressure of one value in the summertime, and to cause the valve to stay open in response to certain abnormal conditions in the winter and be activated by a supply pressure of a different value in the wintertime.

With the above and other objects in view, the present invention consists of improvements in controls for combination heating and cooling systems, and all of its parts and combinations, as set forth in the claims, and all equivalents thereof.

In the accompanying drawings, illustrating one complete embodiment of the preferred form of the invention, in which the same reference numerals designate the same parts in all of the views:

FIG. 2 is a plan view of the valve opening switch used in the improved system;

FIG. 3 is a sectional view taken generally along the line 3—3 of FIG. 2;

FIG. 4 is a sectional detail view of a portion of the adjustable pop valve; and

FIG. 5 is a plan view of the pneumatic amplifier, part of the cover being broken away.

Figure 1:
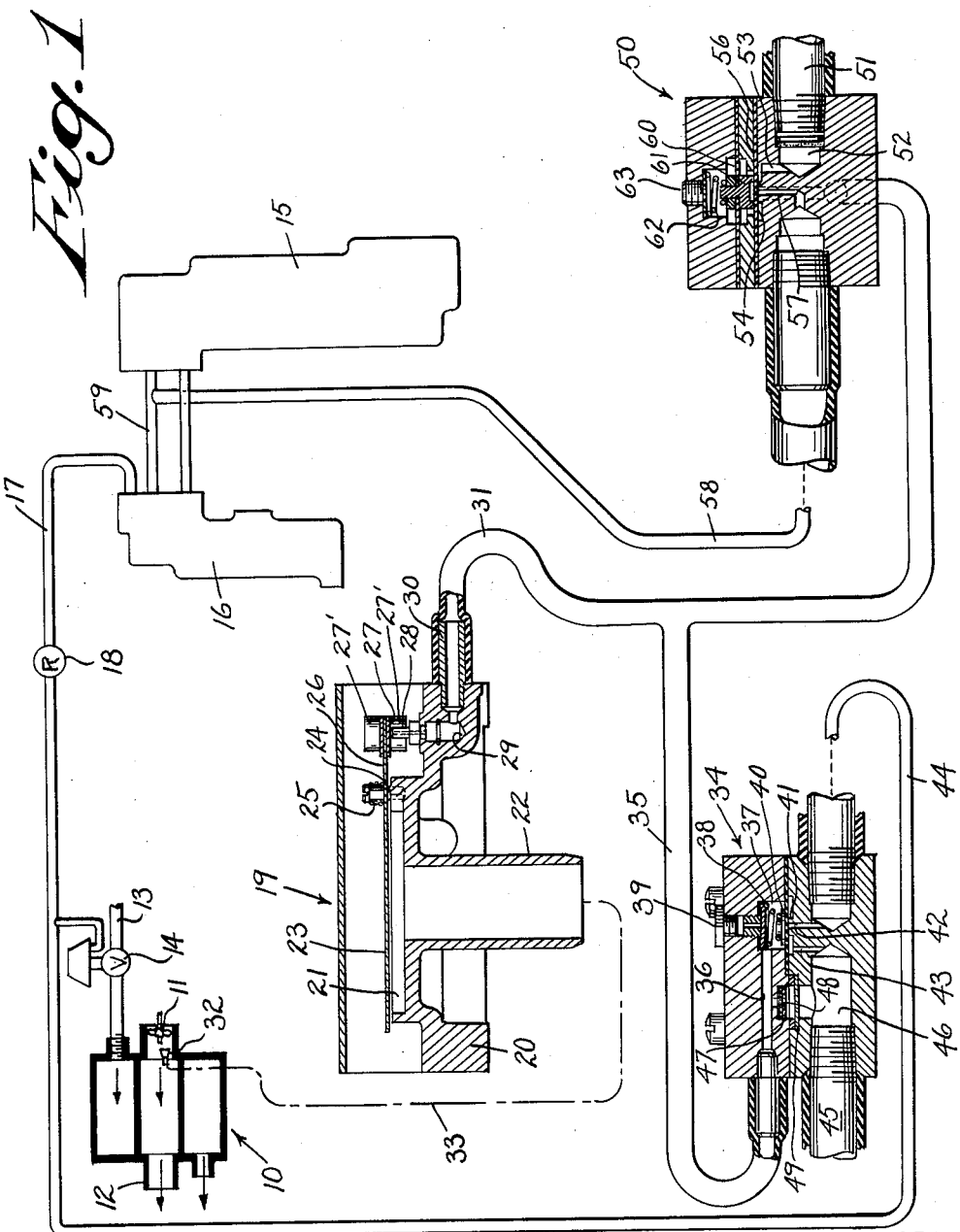
FIG. 1 is a partially diagrammatic view, partly in section, showing the improved system as used in conjunction with a reversible thermostatic system of the type disclosed in Otto Patent No. 2,021,263.

Referring more particularly to the drawings, the numeral 10 diagrammatically designates a heat exchanger which is adapted to be used either for summer cooling or for winter heating, there being a fan or blower 11 for circulating heated air in the winter and cooled air in the summer through the heat exchanger, to be discharged through suitable outlets such as the outlet 12. In the summer a cooling medium, such as cool water, is admitted to the heat exchanger from a suitable source through an inlet pipe 13, past a normally open pneumatically operated valve 14. In the winter a heating medium, such as hot water, passes from a suitable source through the line 13, past the valve 14 and into the heat exchanger. It is to be understood that there may be a plurality of heating or cooling units 10, usually one for each room.

The numeral 15 designates a room thermostat which may be of the pneumatic leakport type disclosed in Otto Patent No. 2,021,263, and the numeral 16 designates a progressive relay capable of providing a somewhat higher valve moving pressure than would otherwise be obtained. This relay may also be like that disclosed in the prior Otto Patent No. 2,021,263. In accordance with the disclosure of the Otto patent, during winter use, when there is a rise in temperature at the thermostat 15, the thermostat acts through the relay 16 and through the output line 17, which has a restrictor 18 therein, to close the pneumatic heat exchanger valve 14 and hence stop the flow of heating medium from the supply line 13 to the heat exchanger 10 until the temperature of the room being controlled again calls for heat. The thermostat 15 will also act, as set forth in the Otto patent, when set for summer conditions, to close the valve 14 in response to a fall in temperature adjacent the thermostat 15. Thus the control of the prior Otto patent provides a reversible thermostatic system capable of taking care of both summer and winter conditions with a single installation.

In carrying out the object of the present invention, wherein a sensing of the relatively low pressure from the blower 11 is used to also control the heat exchanger valve 14, there is employed a pneumatic amplifier which is designated by the numeral 19. The amplifier includes suitable base structure 20 having an upwardly facing shallow cup 21 projecting from its upper surface. Communicating with the bottom of the cup is a low pressure inlet 22. The top of the cup is covered by a lid 23 which is pivoted on a fulcrum 24, the lid being disposed within a covered passageway as shown. The amplifier lid has a portion 26 projecting from the opposite side of the fulcrum which supports a lid portion 27 for a leakport 28, the leakport being in communication with an internal chamber 29 in the base, and the latter communicating through a fitting 30 with a pneumatic line 31. When there is no air acting on the main amplifier lid 23, springs 25 urge the main lid portion toward closed position to cause opening of the leakport lid 27 against the action of weights 27'. Low pressure air from the blower 11 of the heat exchanger is intercepted by a sensing inlet 32 and communicated through a low pressure tube 33 with the inlet passageway 22 of the pneumatic amplifier.

Connected to the pneumatic tube 31, so as to be affected by the pressure therein, is an adjustable pneumatic valve closing switch 34. Pressure from the pneumatic tube 31 is communicated through a tube 35 with an internal passageway 36 leading to a valve chamber 37. A spring 38 in said chamber is acted upon by an adjustment screw 39 and bears on the upper side of a diaphragm 40 to urge the diaphragm against a valve seat 41 to cut off communication between ducts 42 and 43. The output duct 42 is in communication with a tube 44 leading to the control valve 14 for the heat exchanger. The duct 43 is in communication with an inlet chamber 46 to which supply pressure is communicated from an inlet tube 45. Between the inlet chamber 46 and the passageway 36 is an orifice plate 47 (see FIG. 4) having a small orifice 48. There may also be a filter blank 49 interposed between the chamber 46 and the orifice. This orifice acts as a restrictor to limit the action of the leakport 28.

Referring again to FIG. 1, and also to FIGS. 2 and 3, the pneumatic tube 31 connects with a valve opening accessory 50. This accessory admits supply air from the source through an inlet fitting 51 to an inlet chamber 52. A duct 53 leads from the chamber 52 to a chamber 54 surrounding a valve seat 55 (see FIG. 3). A diaphragm 56 is adapted to be moved toward and away from the seat 55 and hence control flow through a duct 57 which is connected with a supply pressure tube 58 leading to a tubular connection 59 between the thermostat 15 and the relay 16 to furnish supply air for the pneumatic thermostat 15 and relay 16.

A second diaphragm 60 supports a stem 61 which is acted upon by a spring 62 to urge the diaphragm 56 into closing engagement with its seat 55. The spring may be adjusted through an adjustment screw 63. The tube 31 from the leakport of the amplifier 19 connects with a passageway 64 in the valve opening accessory, said passageway 64 being in communication with the chamber 64' between the diaphragms.

OPERATION

In use of the improved system, the supply pressure conduits 45 and 51 may lead from a common source. In summertime the supply pressure from this common source is maintained at one value, preferably 19 p.s.i. and in wintertime at a different value, preferably 15 p.s.i.

Referring now to the operation of the valve closing accessory 34 in conjunction with the pneumatic amplifier 19, when there is a winter supply pressure of 15 p.s.i. in the chamber 46, this pressure times the effective area of the diaphragm 40 is less than the pressure acting on top of the diaphragm from the line 35 times the area of the diaphragm plus the pressure of the spring 38. Therefore, the diaphragm 40 will maintain the valve 41 closed and prevent supply pressure from acting in the line 44 on the valve 14.

When the supply pressure on the inlet 46 is 19 p.s.i. for summer use and blower 11 of the heat exchanger is operating properly so as to create pressure in passageway 22 of the pneumatic amplifier, which pressure acts on lid 23 to maintain the leakport 28 closed, pressure from line 35 times the effective area of the diaphragm plus the force of spring 38 will be greater than supply pressure times the effective area. Therefore, valve 41 will be maintained closed. Valve 14 will then operate normally from the thermostat output pressure. However, should the fan 11 become inoperative, then there will be no pressure communicated through the line 33 with the inlet duct 22 of the amplifier, and the springs 25 will act on the lid 23 to open the leakport 28. This will so reduce the pressure in the tube 35 leading to the chamber 37 of the valve closing accessory that the pressures below the diaphragm will be greater, the valve will open and there will be pressures in the line 44 to close the valve 14 and keep it closed until the blower 11 is fixed, so that there is again circulation through the heat exchanger.

Thus if $P_1$ represents the supply pressure in tube 45, if $P_2$ represents the pressure in tube 31–35, if $S_1$ represents the pressure of spring 38, and if A represents the effective area of diaphragm 40, then at supply pressure of 15 p.s.i $$P_1A < P_2A + S_1$$

in all conditions but at supply pressure of 19 p.s.i. with the blower 11 off $$P_1A > P_2A + S_1$$

(if $P_2$ is equal to the pressure at pin valve 48) and in the latter condition the accessory 34 will pass air through line 44 to the normally open valve 14 to close it. If, however, $P_2$ is increased by the action of blower 11 on the amplifier 19, then $$P_1A < P_2A + S_1$$

If a cooling medium were flowing through the heat exchanger with the fan off, there would soon be excessive condensation on the heat exchanger, with resulting dripping and damage. As long as the fan 11 is operating properly, this condensation is prevented. Thus this valve closing feature is a safety factor in the summertime to close the valve when such emergency occurs. At the same time this valve closing feature will not function in the winter because at the winter control pressure of 15 p.s.i. in the inlet 46 the valve 41 of the accessory 34 is always kept closed. At the same time heat exchanger valve 14, in the summer cooling system, is always under the control of the thermostat 15 when the fan 11 is properly operating.

Referring now to the valve opening switch 50 (see FIGS. 1, 2 and 3), this switch operates during the heating season and, therefore, is responsive to the output of the amplifier 19 only when the supply pressure at 51 is 15 p.s.i. During such operation, if the blower 11 is operating properly, then the leakport 28 of the amplifier 19 is maintained in close condition. The supply pressure from the tube 31, communicating through the passageway 64 and acting on the diaphragm 56 will, in conjunction with the supply pressure in the passageway 53 acting in the chamber 54, be greater than the pressure exerted by the spring 62. Thus the valve 55 of the switch 50 will be opened so that the supply pressure at 15 p.s.i can pass from the inlet 51 out through the output line 57 which leads to the output tube 58, the latter communicating with the tubular supply connection 59 for the thermostat 15 and the relay 16. Thus in the winter, when the blower 11 is operating properly, the valve 14 for the heat exchanger is under the control of the thermostat 15 at the winter pressure of 15 p.s.i. In summer, when there is a supply pressure of 19 p.s.i in the supply line 51, the valve 55 of accessory 50 is always maintained open by this higher pressure, regardless of the pressure from the amplifier tube 31.

Should, however, the blower 11 fail during winter operation, then it is desirable that the heat exchanger valve be kept wide open to get maximum heat until forced circulation is again obtained. When this occurs, there is no low pressure acting through the tubes 33 and 22 to aid the weights 27' in maintaining the leakport 28 of the amplifier 19 closed. Instead, the springs 25 open the leakport lid 27 to exhaust pressure from the tube 31. This lowers the pressure acting in the chamber 64', causing the valve 55 of the accessory 50 to be closed as a result of the action of the spring 62, the winter pressure of 15 p.s.i. being insufficient to keep the diaphragm in raised condition. This then will shut off flow of air from the source 51 through passageways 57 and 58 to the thermostat supply line 59. Thus supply air to the thermostat 15 is cut off and the normally open valve 14 will stay open regardless of the effect of the temperature of the room on the thermostat.

It is thus apparent that the valve opening accessory 50, in conjunction with the pneumatic amplifier 19, will serve to permit flow of supply pressure at the winter valve to the thermostat whenever the blower 11 is operating properly, but will cut off such flow automatically in case of failure of the blower, thus allowing the normally open heat exchanger valve 14 to stay in open condition so that the heating medium will continue to flow through the heat exchanger regardless of the thermostat 15 until the blower 11 is again operating properly.

It is also apparent that by having a single pneumatic amplifier in conjunction with a simple valve closing accessory and with a simple valve opening accessory, that a single system may be made to control the heat exchanger valve both in summer and in winter, and be responsive to failure of the blower in summer to close the valve 14 and responsive to failure of the blower in winter to maintain the valve 14 open.

It is to be understood that various changes and modifications may be made without departing from the spirit of the invention, and all of such changes are contemplated as may come within the scope of the following claims.

What we claim is:

1. In combination with a heat exchanger having a low pressure air circulating blower for moving air past said heat exchanger in heat exchange relation therewith and having a normally open thermostatically controlled pneumatically operated valve for controlling the flow of a heating medium to the heat exchanger, pneumatic means including a pneumatic device so connected with said heat exchanger as to be responsive to a failure of air from said blower for preventing closing of said value as long as said failure of air exists.

2. In combination with a heat exchanger having a low pressure air circulating blower and having pneumatically operated normally open regulating means for controlling the flow of a heat exchange medium to the heat exchanger, pneumatic means including a pneumatic device so connected with said heat exchanger as to be responsive to a failure of air from said blower for closing said regulating means, a source of supply air for said pneumatic means, and means whereby said pneumatic means causes closing of the regulating means when the supply air pressure is at one value and prevents closing when said supply air pressure is at a different value.

3. In combination with a heat exchanger having a low pressure air circulating blower and having pneumatically operated regulating means for controlling the flow of a heat exchange medium to said heat exchanger, a pneumatic amplifier having a leakport, said amplifier being connected to the heat exchanger in the vicinity of said blower and having means responsive to failure of air from said blower for opening said leakport, and means including a valve closing switch pneumatically connected between said leakport and regulating means for the heat exchanger for causing closing of the latter whenever the leakport of the amplifier is opened due to a failure of circulating air.

4. In combination with a heat exchanger having a low pressure air circulating blower and having a normally open pneumatically operated regulating means for controlling the flow of a heat exchange medium to said heat exchanger, a pneumatic circuit for said pneumatic regulating means, a pneumatic thermostat in said pneumatic circuit for controlling the regulating means in accordance with room temperature, said pneumatic circuit including a supply air tube for the pneumatic thermostat, and means including a pneumatic device connected in the supply air tube and responsive to failure of air from said blower for preventing flow of supply air to said thermostat to thereby cause the normally open regulating means to be maintained in open condition.

5. In combination with a heat exchanger having a low pressure air circulating blower and having a normally open pneumatically operated regulating means for controlling the flow of heat exchange medium to said heat exchanger, a pneumatic circuit for said pneumatic regulating means, a pneumatic amplifier having a leakport, said amplifier being connected to the heat exchanger in the vicinity of said blower and having means responsive to failure of air from said blower for opening said leakport, a pneumatic thermostat in said pneumatic circuit for controlling the regulating means in accordance with room temperature, said pneumatic circuit including a supply air tube for the pneumatic thermostat, means including a pneumatic device connected in the supply air tube and connected in said pneumatic circuit so as to be responsive to opening of said leakport as a result of failure of air from said blower for preventing flow of supply air to said thermostat only when the pressure of the supply air is at one of two different values to thereby cause the normally open regulating means to be maintained in opened condition, and means including a valve closing switch pneumatically connected in the circuit between said leakport and regulating means for the heat exchanger for causing closing of the latter only when the pressure of the supply air is at the other of said two different values and when the leakport of the amplifier is opened due to a failure of circulating air.

6. In combination with a heat exchanger having a low pressure air circulating blower and having pneumatically operated regulating means for controlling the flow of a heat exchange medium to the heat exchanger, a pneumatic control circuit for said regulating means, a low pressure sensing pneumatic amplifier having a leakport in said control circuit and having a pivotally mounted leakport lid, means normally biasing said lid toward leakport opening position, means including an air pressure transmitting connection between said amplifier and said heat exchanger for transmitting low pressure air from said blower to said leakport lid to maintain said leakport lid in leakport closing position when said blower is operating whereby upon failure of air from said blower said leakport lid is moved by said biasing means to leakport opening position, and means in said control circuit responsive to opening and closing of said leakport for operating said pneumatic regulating means.

7. In combination with a heat exchanger having a low pressure air circulating blower and having pneumatically operated regulating means for controlling the flow of a heat exchange medium to the heat exchanger, a pneumatic control circuit for said regulating means, a low pressure sensing pneumatic amplifier having a leakport in said control circuit and having a pivotally mounted leakport lid, means normally biasing said lid toward leakport opening position, means including an air pressure transmitting connection between said amplifier and said heat exchanger for transmitting low pressure air from said blower to said leakport lid to maintain said leakport lid in leakport closing position when said blower is operating whereby upon failure of air from said blower said leakport lid is moved by said biasing means to leakport opening position, and a pneumatic switch in said control circuit responsive to opening and closing of said leakport for operating said pneumatic regulating means.

8. In combination with a heat exchanger having a low pressure air circulating blower and having a pneumatically operated, normally open valve for controlling the flow of heat exchange medium to the heat exchanger, a pneumatic control circuit for said valve, a low pressure sensing pneumatic amplifier having a leakport in said control circuit and having a leakport lid, means normally biasing said lid toward leakport opening position, means including an air pressure transmitting connection between said leakport lid and said heat exchanger for causing movement of said lid toward leakport closing position when said blower is operating whereby upon failure of air from said blower said leakport lid is moved by said biasing means to leakport opening position, means in said control circuit responsive to opening of said leakport for closing said valve when the control pressure in the control circuit is at one value, and means in said control circuit responsive to opening of said leakport for maintaining said valve in open condition when the control pressure in the control circuit is at a different value.

References Cited by the Examiner
UNITED STATES PATENTS

| | | | |
|---|---|---|---|
| Re. 21,924 | 10/1941 | Mueller | 236—38 |
| 883,283 | 3/1908 | Brown | 236—15 |
| 1,576,754 | 3/1926 | McLean | 236—15 |
| 1,645,506 | 10/1927 | McKee. | |
| 2,304,268 | 12/1942 | McGoldrick. | |

EDWARD J. MICHAEL, *Primary Examiner.*